United States Patent
Germino Ferreira Da Silva et al.

(10) Patent No.: US 11,952,534 B2
(45) Date of Patent: Apr. 9, 2024

(54) METHOD FOR THE COMBINED APPLICATION OF SCALE REMOVER AND INHIBITOR

(71) Applicant: Petróleo Brasileiro S.A.—Petrobras, Rio de Janeiro (BR)

(72) Inventors: Mario Germino Ferreira Da Silva, Rio de Janeiro (BR); Sergio Taveira De Camargo Junior, Rio de Janeiro (BR); Tiago Cavalcante Freitas, Rio de Janeiro (BR); Giselle Maria Lopes Leite Da Silva, Aracaju (BR); Francisca Ferreira Do Rosario, Rio de Janeiro (BR); Francileide Gomes Da Costa, Rio de Janeiro (BR); Katia Regina Silva Alves Da Rosa, Rio de Janeiro (BR); Rosane Alves Fontes, Petrópolis (BR)

(73) Assignee: Petróbras Brasileiro S. A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/790,175

(22) PCT Filed: Dec. 18, 2020

(86) PCT No.: PCT/BR2020/050566
§ 371 (c)(1),
(2) Date: Jun. 30, 2022

(87) PCT Pub. No.: WO2021/134120
PCT Pub. Date: Jul. 8, 2021

(65) Prior Publication Data
US 2023/0043123 A1    Feb. 9, 2023

(30) Foreign Application Priority Data

Dec. 30, 2019    (BR) .................. 10 2019 028273 8

(51) Int. Cl.
*C09K 8/52*      (2006.01)
*E21B 37/06*    (2006.01)

(52) U.S. Cl.
CPC ................ *C09K 8/52* (2013.01); *E21B 37/06* (2013.01)

(58) Field of Classification Search
CPC ...... C09K 8/528; C09K 2208/32; C09K 8/52; C09K 8/524; C09K 8/74; C09K 8/54;
(Continued)

(56) References Cited

U.S. PATENT DOCUMENTS

| | | |
|---|---|---|
| 3,688,829 A | 9/1972 | Jones |
| 4,602,683 A | 7/1986 | Meyers |

(Continued)

FOREIGN PATENT DOCUMENTS

| | | | | |
|---|---|---|---|---|
| CA | 1216516 A | | 1/1987 | |
| CA | 2752264 C | * | 9/2014 | ............... C09K 8/34 |

(Continued)

OTHER PUBLICATIONS

Calin et al. (Mar. 2015) "Comportamento de reagentes inibidores de incrustação aplicados na perfuração de poços de petróleo", Matéria (Rio de Janeiro), 20(2):514-522.

*Primary Examiner* — Zakiya W Bates
(74) *Attorney, Agent, or Firm* — Mintz, Levin, Cohn, Ferris, Glovsky and Popeo, P.C.

(57) ABSTRACT

A joint application process of two treatments, scale removal and inhibitor squeeze injection, is described herein. Through the simultaneous positioning inside the reservoir, it can be applied in scale removal operations for carbonate formations, such as the pre-salt case. Accordingly, there is a way to improve the efficiency of reservoir management, through an innovation in the scaling management process.

8 Claims, 3 Drawing Sheets

(58) Field of Classification Search
CPC .......... E21B 37/06; E21B 43/27; E21B 43/16; E21B 43/25; E21B 41/02; E21B 21/00
See application file for complete search history.

(56) References Cited

U.S. PATENT DOCUMENTS

| | | |
|---|---|---|
| 6,903,054 B2 | 6/2005 | Fu et al. |
| 2003/0150613 A1 | 8/2003 | Freiter |

FOREIGN PATENT DOCUMENTS

| | | | |
|---|---|---|---|
| CN | 101851028 A | | 10/2010 |
| CN | 101768430 B | * | 5/2012 |
| CN | 102703045 A | | 10/2012 |
| CN | 104962266 A | | 10/2015 |
| CN | 110513081 A | | 11/2019 |
| WO | 2008073233 A2 | | 6/2008 |
| WO | 2016100813 A1 | | 6/2016 |

* cited by examiner

METHOD FOR THE COMBINED APPLICATION OF SCALE REMOVER AND INHIBITOR

FIELD OF THE INVENTION

The present invention addresses to the joint application of two treatments, scale removal and squeeze injection, through the simultaneous positioning within the reservoir with application in the field of drilling and completion of wells, as well as in lifting and flow technologies, aiming at guaranteeing the productivity of the oil field.

DESCRIPTION OF THE STATE OF THE ART

Most of the oil production in Brazil occurs in offshore scenarios, so the marine environment is always challenging the oil engineers as to the flow assurance technology, in the search for solutions to mitigate problems related to the characteristics of the environment, such as for example, the increasingly deeper water depths, the low temperatures on the seabed, the distance between the producing wells and the offshore production unit, sometimes reaching 8 km, the heat exchange between the production lines with the environment on the seabed, the precipitation of organic compounds such as paraffins, asphaltenes and deposits of inorganic salts such as strontium sulfate and calcium carbonate within the subsea production system.

The development of the production of an oil field is a very complex process, since, after the installation of the production system as far as the field is producing, it is necessary to carry out the maintenance of its production.

Annually, Petrobras, in the same way as other operators around the world, consumes millions of dollars to correct the negative effects of the process of scaling in the production system, since the occurrence of these causes a reduction in the productivity of the field, leading to a loss of the revenue generated by field production.

In order to guarantee the productivity of the oil field, the injection of seawater is carried out in the reservoir, through injection wells, with the objective of maintaining the pressure of the drained reservoirs, replacing the removed mass, and also for the displacement of the oil towards to producing wells. When passing through the reservoir, the sea water comes into contact with the water of the reservoir due to the different chemical compositions, and the formation of scaling salts occurs, which are deposited from the reservoir, production well, subsea lines, production riser of the production system of the Stationary Production Unit (SPU).

In this way, scale removal treatments are carried out through the application of different methods, according to the type of formed scale, whether organic or inorganic.

The scale removal treatment is done by pumping from a stimulation boat connected to the SPU, and from this through the production lines and/or gas lift to the well Christmas tree, followed by the production string until it is injected into the reservoir. The removal treatment is then left for a while inside the reservoir to perform, in this way, the scale removal by dissolving the formed scale.

However, when necessary, after the removal treatment, an inhibition treatment is also carried out in the reservoir. First, some procedures would be necessary, such as putting the well into production to recover the residual scale removal treatment in the reservoir. After the complete cleaning of the scale removing product from the reservoir, then the second operation would be carried out, which would be the inhibition operation, which consists of injecting a scale inhibitor product into the tank, designed to have a useful life depending on the adsorption and desorption characteristics of the reservoir rock in face of the applied product, which will be produced gradually along with the water produced by the reservoir.

The time required to carry out the two operations in sequence would be longer, depending on the cleaning of the well between the two operations, which may take a few days; with the innovation of the present invention, there is a reduction in the cleaning time, and the optimization of the critical resource utilization with the completion probe and stimulation boat.

Patent application BR1020170255905 refers to the field of treatments of subterranean formations for the extraction of hydrocarbons and, particularly, to a method of treatment of subterranean formations that aims at preventing and/or reducing the formation of scale. More specifically, it is a method of treating subterranean formations by injecting an association comprising at least one scale inhibiting compound and at least one polymer. The treatment method consists of injecting, either sequentially or in a mixture, the scale inhibitor and the polymer. In the case of sequential injection, the inhibitor is injected first. The polymer is injected after the scale inhibitor. The sequential or mixed combined injection of the scale inhibitor and the polymer makes it possible to triple the duration of the injection treatment, when compared to an injection treatment that uses only the inhibitor.

Document U.S. Pat. No. 4,602,683 refers to squeeze treatments of subterranean scale inhibitors. More particularly, a solution of a scale inhibitor with a solubility that significantly decreases with decreasing pH is injected into a subsurface formation adjacent to a production well, and later the pH of the solution is reduced to precipitate the scale inhibitor in the formation.

Document US20030150613 discloses a one-step squeeze treatment of a subterranean formation involving a treatment comprising an acid, a scale inhibitor and a reducing agent. The presence of the reducing agent prevents the iron ions in the system from reacting and forming a precipitate with the scale inhibitor and keeps the iron ions in the ferrous state.

The paper "Rosa, Calin et al. Comportamento de reagentes inibidores de incrustação aplicados na perfuração de poços de petróleo, Revista Matéria, Porto Alegre, v. 20, n. 02, p. 514-522, March, 2015" aims at synthesizing and analyzing two types of scale inhibitors with the purpose of evaluating their efficiencies of inhibition of scale formed by calcium ions, as well as their compatibilities with cationic and anionic brines that simulate the compositions of the waters involved in the exploration of a Brazilian oil platform. The two inhibitors containing the phosphonate and amine (IN-A) and polymeric (IN-B) functional groups were investigated for application in oil extraction in Brazilian offshore platforms.

Differently from the other documents, the present invention discloses that the joint application of the two treatments, the scale removal and the inhibitor squeeze injection, through the simultaneous positioning inside the reservoir, can be applied in the scaling removal operations for carbonate formations, as is the case of the pre-salt.

Thus, the mentioned documents do not disclose scale removers and scale inhibitor squeeze solutions mixed together forming a single solution, which is injected into the reservoir to simultaneously provide scale removal followed by inhibition of the reservoir rock of carbonate formations.

In this way, the present invention increases the efficiency in the reservoir management process, since the joint application of scale remover and inhibitor will generate economic gain, due to the reduction of operational time, optimizing the treatment time, reduction of the time in which the well would be closed without producing oil, increasing the productivity of the wells, thus improving the production curve of the field and thus the NPV of the process.

Additionally, with the increase in the NPV of the project due to the increase in the field production curve, there is an economy in the development of field production through the possibility of reducing the total number of treatments, due to the maintenance of the production flow rate of the field. In addition, there is an increase in the project NPV due to the reduction in probe time, which is considered a critical resource.

BRIEF DESCRIPTION OF THE INVENTION

The present invention addresses to the joint application of two treatments, scale removal and inhibitor squeeze injection. Through the simultaneous positioning inside the reservoir, it can be applied in scale removal operations for carbonate formations, such as in the pre-salt case. This is a way to improve the efficiency of reservoir management, through an innovation in the fouling management process.

BRIEF DESCRIPTION OF DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

Figure 1:
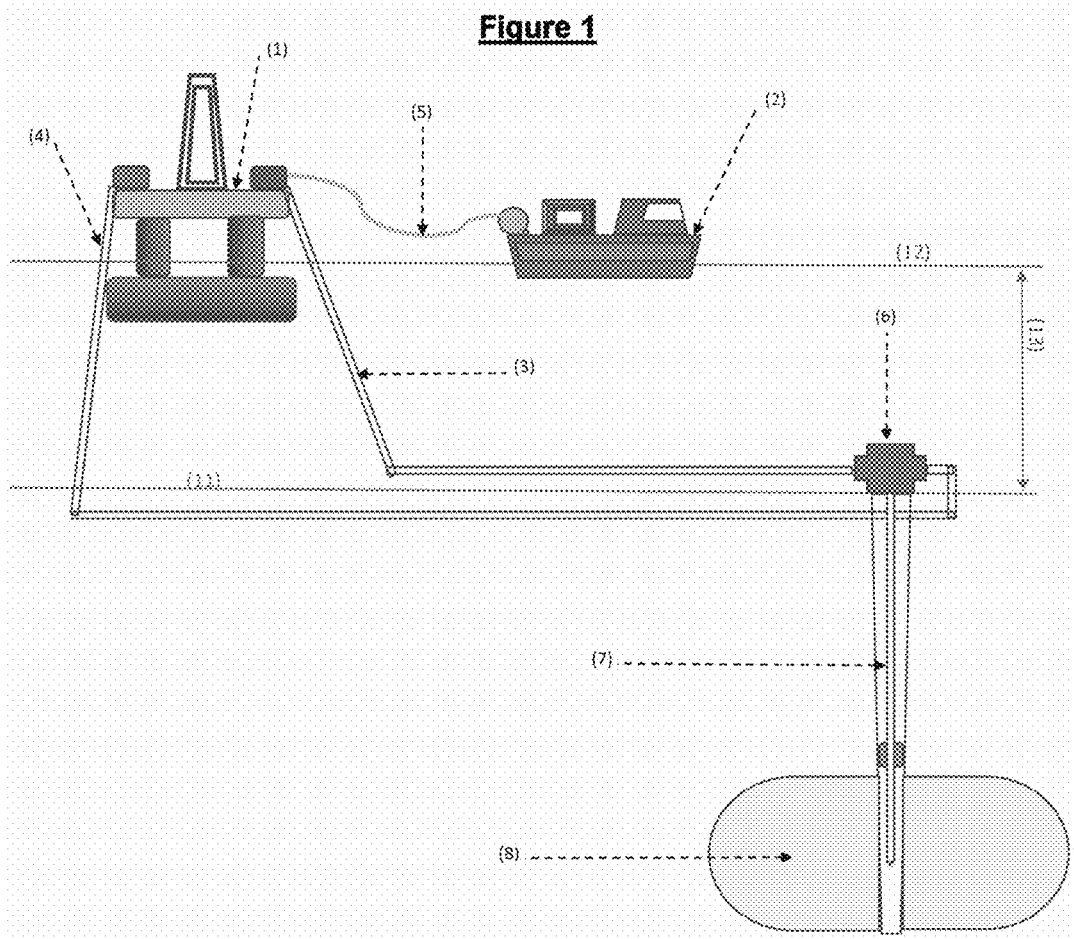
FIG. 1 illustrates a representative view of the stationary production unit, stimulation boat, coflexip line, production line, gas lift line, wet Christmas tree, production string and the reservoir.
Figure 2:
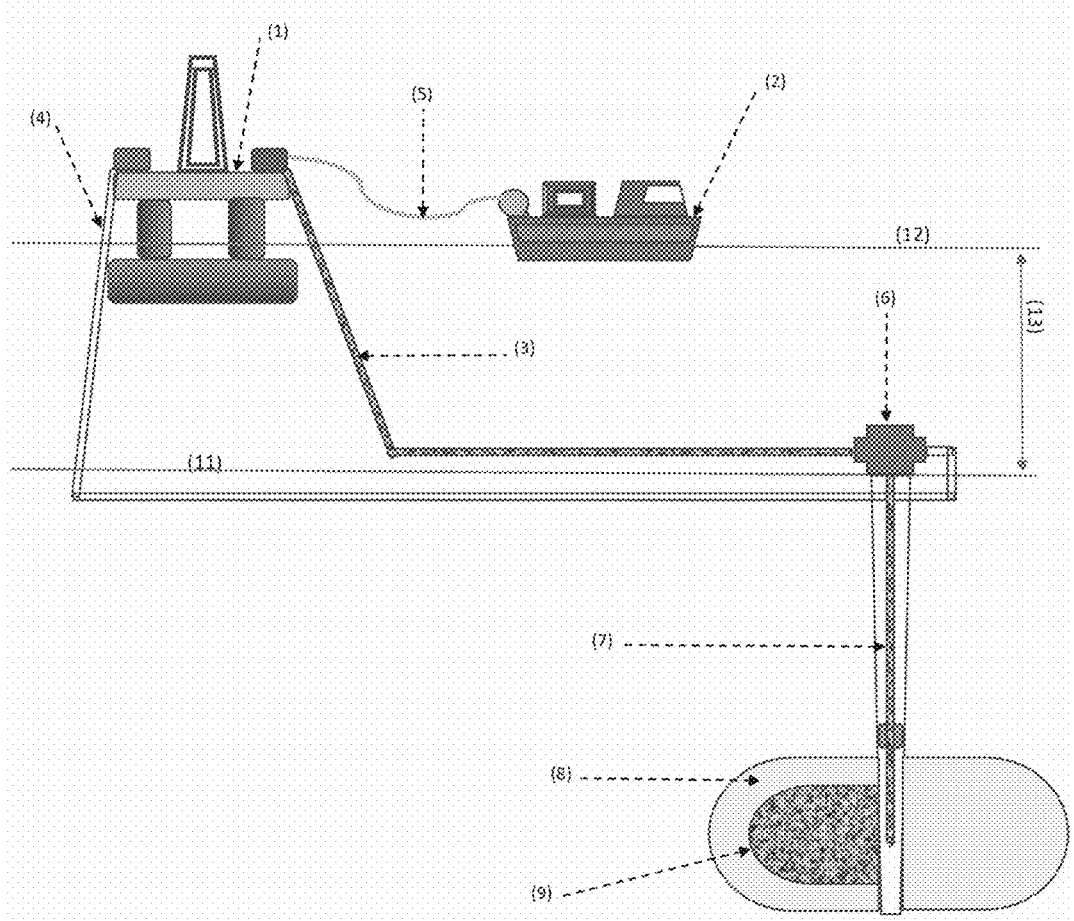
FIG. 2 illustrates a representative view of pumping the acid solution together with the scale inhibitor, from the stimulation boat through the coflexip line to the stationary production unit, and from there through the production line to the wet Christmas tree, and from there through the string to the reservoir.
Figure 3:
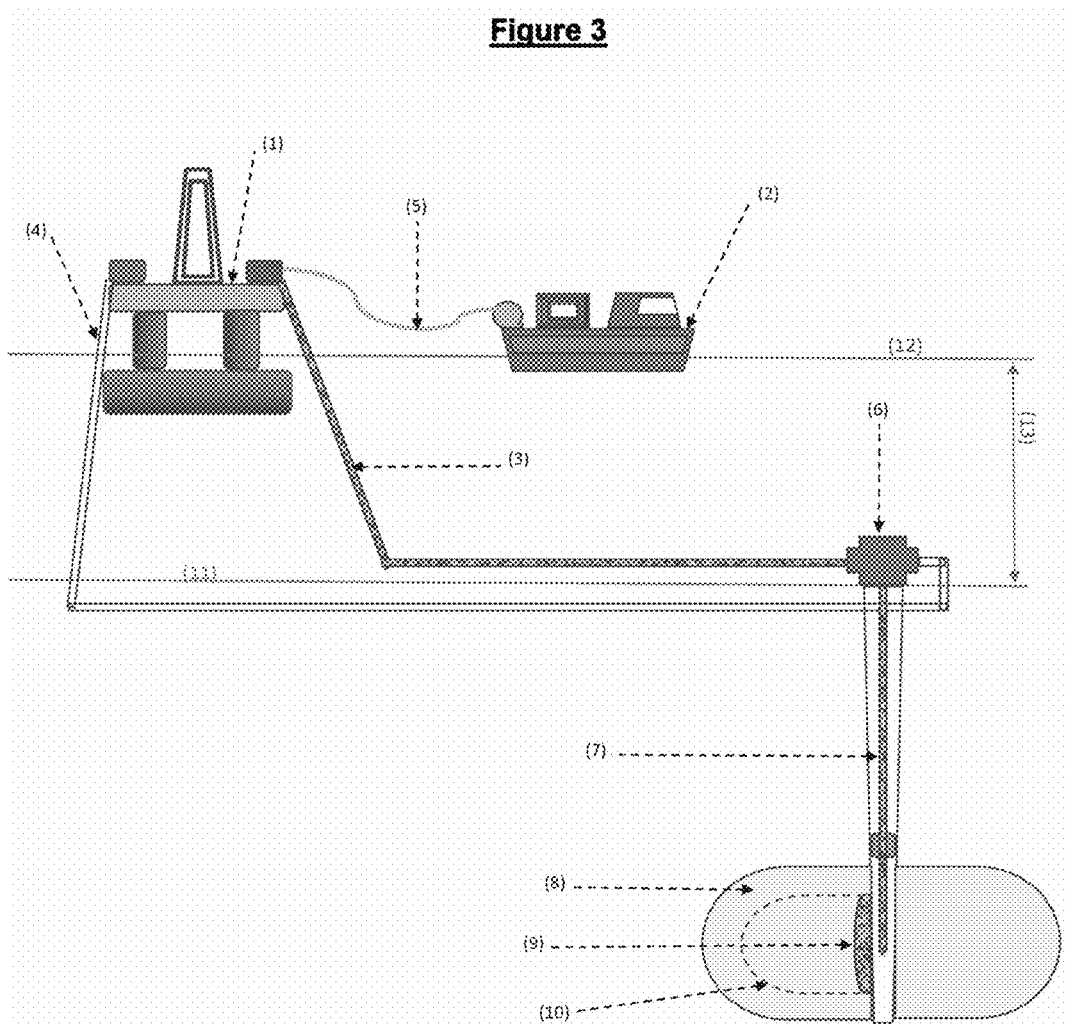
FIG. 3 illustrates a representative view of the opening of the well, after the programmed time of contact of the acid with the reservoir, for the removal of spent acid from the reservoir and simultaneously the fixation of the inhibitor in the reservoir rock, the spent acid rises through the string, passes through the wet Christmas tree and goes through the production line to the stationary production unit where it will be processed.

The present invention addresses to a method for the joint application of two treatments, that is, the one for scale removal, and/or reservoir stimulation; and the inhibitor squeeze injection. The removal and/or stimulation of the reservoir can be by the removal solution being any acids, preferably acetic acid, formic acid and hydrochloric acid. With the use of a stimulation boat (2), positioned on the sea level (12) in parallel with the stationary production unit (1), connected to the stationary production unit (1) by a coflexip line (5), to pump the mixture of acid and inhibitor through the stationary production unit (1) following the production line (3) or the gas lift line (4), both are immersed in the water layer (13), up to the wet Christmas tree (6), which is positioned in the mud line (11), where the mixture of acid and inhibitor accesses the well, following the production string (7), for the simultaneous positioning inside the reservoir (8), where the mixture remains for a designed time that was planned based on the tests carried out with plugs of the reservoir rock, for the stimulation of the reservoir, for the removal of damage and for the inhibition of the reservoir (9); after the time programmed for the treatment, the well is open for production to the stationary production unit (1), then the mixture that was residing in the reservoir (9) is produced, leaving the inhibitor adsorbed in the reservoir (10), through the production string (7), passing through the wet Christmas tree (6), and from there to the production line (3) until arriving at the stationary production unit (1), where the mixture and oil will be processed in the production plant. This type of method can be applied in scale removal operations for carbonate formations, such as the case of the pre-salt. This is a way to improve the efficiency of reservoir management, through an innovation in the fouling management process.

Example 1: Dynamic Efficiency Tests with Scale Inhibitors

Dynamic efficiency tests with scale inhibitors were performed with products that present the same active principle based on compounds derived from phosphonic acids with general formula $RP(O)(OH)_2$, with different concentrations of active matter, were carried out at 62° C., using synthetic produced water with the chemical composition of the produced water from well 7-LL-2D-RJS. These results determined the minimum effective concentrations of 10 and 20 mg/L of the inhibitor based on compounds derived from phosphonic acids with the general formula $RP(O)(OH)_2$, with different concentrations of active matter respectively.

Example 2: Flow Tests in Porous Media

Previous tests of flow in porous media, in which there were used formulations with 10% v/v of the inhibitor based on compounds derived from phosphonic acids with general formula $RP(O)(OH)_2$, diluted in a 2% m/v KCl solution, showed that the inhibitor is adsorbed on the reservoir rock and subsequently desorbed, without causing damage to its permeability. These tests simulated in the laboratory the treatment of scale inhibitor squeeze and allowed to obtain the adsorption isotherms, which can be used for the dimensioning of treatments in producing wells and assessment of the lifetime of these treatments.

Example 3: Flow Test in Porous Media

In this flow test in porous media, two formulations were used: one 20% v/v formulation of the inhibitor based on compounds derived from phosphonic acids with general formula $RP(O)(OH)_2$, in 15% HCl, and another of the commercial inhibitor as supplied. Tests performed at 60° C. showed that the inhibitor does not negatively impact acidification efficiency. The inhibitor is fixed in the reservoir rock and later released (10), without causing additional damage to its permeability. The inhibitor based on compounds derived from phosphonic acids, with general formula $RP(O)(OH)_2$, was shown to be compatible with: synthetic produced water (calcium content ranging between 2080 and 20000 mg/L), 15% HCl solution and 10% acetic acid solution.

In this innovation, the scale remover solutions and the scale inhibitor squeeze solutions are mixed and thus form a single solution, which will be injected to simultaneously provide scale removal followed by carbonate rock inhibition of the pre-salt.

The application and assessment of commercial scale inhibitor based on compounds derived from phosphonic acids with general formula $RP(O)(OH)_2$, diluted in cushions of 75% HCl or 10% acetic acid, is also recommended for testing field and pilot wells, due to the satisfactory results obtained on a laboratory scale with a core sample from the Barra Velha do Campo de Lula reservoir. For a field test, in the pilot well production scenario, the additivation of acid cushions with 20% v/v of the inhibitor based on compounds derived from phosphonic acids with general formula $RP(O)(OH)_2$ is recommended.

Additionally, it is recommended to apply the same inhibitor at the end of acid cushions, followed by aqueous overflush and another organic one. Thus, it is estimated for this treatment the consumption of 60,000 liters of the inhibitor based on compounds derived from phosphonic acids with the general formula $RP(O)(OH)_2$.

It is further recommended to carry out an assessment of the compatibility of the inhibitor based on compounds derived from phosphonic acids with the general formula $RP(O)(OH)_2$, with materials, produced fluids and other chemicals dosed in the production system. The efficiency of the recommended treatment should be assessed based on the monitoring of the produced water composition, residual scale inhibitor, production tests and assessment of PDG (downhole pressure gage) and TPI (interval temperature gage) data.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A method comprising:
preparing a scale remover solution;
preparing a scale inhibitor squeeze solution;
mixing the scale remover solution and the scale inhibitor squeeze solution, to thereby form a mixture; and
injecting the mixture into a reservoir at a temperature of 60° C., using water produced from a well, with a calcium content ranging from 2,080 to 20,000 mg/L, to provide simultaneously removal of scale followed by inhibition of scale from and on reservoir rock.

2. The method according to claim 1, wherein the scale removal solution is an acid.

3. The method according to claim 2, wherein the acid comprises acetic acid, formic acid, or hydrochloric acid.

4. The method according to claim 1, wherein the scale inhibitor has a same active principle as compounds derived from phosphonic acids with different concentrations of active matter.

5. The method according to claim 1, wherein the scale inhibitor is in a concentration range between 10 to 20 mg/L.

6. The method according to claim 1, wherein the scale inhibitor is at a concentration of 10% v/v diluted in 2% m/v KCl solution.

7. The method according to claim 1, wherein the scale inhibitor is at a concentration of 20% v/v diluted in 15% HCl solution or 10% acetic acid.

8. The method according to claim 1, wherein the method provides a triple function that includes reservoir stimulation, scale removal, and scale inhibition, at least by matrix acidification and consequent distribution of an inhibitor cushion in heterogeneous and reactive reservoirs.

* * * * *